(12) United States Patent
Hall et al.

(10) Patent No.: US 7,586,934 B2
(45) Date of Patent: Sep. 8, 2009

(54) APPARATUS FOR FIXING LATENCY (75) Inventors: David R. Hall, Provo, UT (US); David B. Bartholomew, Springville, UT (US); Justin Moon, Bountiful, UT (US); Roger O. Koehler, Provo, UT (US)

(73) Assignee: IntelliServ International Holding, Ltd (KY)

( * ) Notice: Subject to any disclaimer, the term of this patent is extended or adjusted under 35 U.S.C. 154(b) by 809 days.

(21) Appl. No.: 10/710,882

(22) Filed: Aug. 10, 2004

(65) Prior Publication Data
US 2005/0036507 A1 Feb. 17, 2005

Related U.S. Application Data (63) Continuation-in-part of application No. 10/710,790, filed on Aug. 3, 2004, now Pat. No. 7,139,218.

(60) Provisional application No. 60/481,225, filed on Aug. 13, 2003.

(51) Int. Cl.
H04L 12/66 (2006.01)
(52) U.S. Cl. ........................ 370/463; 370/474
(58) Field of Classification Search ............. 370/474, 370/503, 463; 367/82; 340/853.3; 702/6
See application file for complete search history.

(56) References Cited

U.S. PATENT DOCUMENTS

| | | | | |
|---|---|---|---|---|
| 2,379,800 | A | * | 7/1945 | Hare .................... 336/105 |
| 2,414,718 | A | | 1/1947 | Cloud |
| 3,518,608 | A | | 6/1970 | Papadopoulos |
| 4,001,774 | A | * | 1/1977 | Dawson et al. .......... 340/854.6 |
| 4,608,685 | A | * | 8/1986 | Jain et al. .................. 370/352 |
| 4,737,950 | A | * | 4/1988 | Fechalos .................. 370/434 |
| 4,739,325 | A | | 4/1988 | MacLeod |
| 4,788,544 | A | | 11/1988 | Howard |
| 4,901,289 | A | * | 2/1990 | Cretin et al. .............. 367/34 |
| 5,157,392 | A | * | 10/1992 | Zimmer ................. 340/853.9 |
| 5,220,676 | A | * | 6/1993 | LoGalbo et al. ........... 455/503 |
| 5,257,392 | A | * | 10/1993 | Okamoto .................. 712/26 |
| 5,959,547 | A | * | 9/1999 | Tubel et al. ............ 340/853.2 |
| 6,012,015 | A | | 1/2000 | Tubel |

(Continued)

OTHER PUBLICATIONS

PCT/US 03/16475, Published Dec. 4, 2003, Applicant Baker Hughes; International Search Report: "Documents Considered to Be Relevant".

Primary Examiner—Kwang B Yao
Assistant Examiner—Andrew Lai
(74) Attorney, Agent, or Firm—Victor Segura; Daniel P. Nelson (57) ABSTRACT An apparatus for fixing computational latency within a deterministic region on a network comprises a network interface modem, a high priority module and at least one deterministic peripheral device. The network interface modem is in communication with the network. The high priority module is in communication with the network interface modem. The at least one deterministic peripheral device is connected to the high priority module. The high priority module comprises a packet assembler/disassembler, and hardware for performing at least one operation. Also disclosed is an apparatus for executing at least one instruction on a downhole device within a deterministic region, the apparatus comprising a control device, a downhole network, and a downhole device. The control device is near the surface of a downhole tool string. The downhole network is integrated into the tool string. The downhole device is in communication with the downhole network.

28 Claims, 7 Drawing Sheets

U.S. PATENT DOCUMENTS

| | | | |
|---|---|---|---|
| 6,073,053 A | 6/2000 | Dummermuth | |
| 6,252,518 B1 | 6/2001 | Laborde | |
| 6,392,317 B1 | 5/2002 | Hall et al. | |
| 6,580,720 B1 | 6/2003 | Francis et al. | |
| 6,654,834 B1 | 11/2003 | Robertson et al. | |
| 6,670,880 B1 | 12/2003 | Hall et al. | |
| 6,688,396 B2 | 2/2004 | Floerke et al. | |
| 6,717,501 B2 | 4/2004 | Hall et al. | |
| 6,799,632 B2 | 10/2004 | Hall et al. | |
| 6,821,147 B1 | 11/2004 | Hall et al. | |
| 6,830,467 B2 | 12/2004 | Hall et al. | |
| 6,844,498 B2 | 1/2005 | Hall et al. | |
| 6,866,306 B2 | 3/2005 | Boyle et al. | |
| 6,888,473 B1 | 5/2005 | Hall et al. | |
| 6,895,189 B1 * | 5/2005 | Bedrosian | 398/155 |
| 6,913,093 B2 | 7/2005 | Hall et al. | |
| 6,929,493 B2 | 8/2005 | Hall et al. | |
| 6,945,802 B2 | 9/2005 | Hall et al. | |
| 6,968,611 B2 | 11/2005 | Hall et al. | |
| 7,085,237 B1 * | 8/2006 | Teodorescu | 370/242 |
| 2002/0120800 A1 * | 8/2002 | Sugahara et al. | 710/260 |
| 2004/0039466 A1 | 2/2004 | Lilly et al. | |
| 2004/0104797 A1 | 6/2004 | Hall et al. | |
| 2004/0113808 A1 | 6/2004 | Hall et al. | |
| 2004/0145492 A1 | 7/2004 | Hall et al. | |
| 2004/0150532 A1 | 8/2004 | Hall et al. | |
| 2004/0164833 A1 | 8/2004 | Hall et al. | |
| 2004/0164838 A1 | 8/2004 | Hall et al. | |
| 2004/0216847 A1 | 11/2004 | Hall et al. | |
| 2004/0244916 A1 | 12/2004 | Hall et al. | |
| 2004/0244964 A1 | 12/2004 | Hall et al. | |
| 2004/0246142 A1 | 12/2004 | Hall et al. | |
| 2005/0001735 A1 | 1/2005 | Hall et al. | |
| 2005/0001738 A1 | 1/2005 | Hall et al. | |
| 2005/0035874 A1 | 2/2005 | Hall et al. | |
| 2005/0035875 A1 | 2/2005 | Hall et al. | |
| 2005/0035876 A1 | 2/2005 | Hall et al. | |
| 2005/0036507 A1 | 2/2005 | Hall et al. | |
| 2005/0039912 A1 | 2/2005 | Hall et al. | |
| 2005/0045339 A1 | 3/2005 | Hall et al. | |
| 2005/0046586 A1 | 3/2005 | Hall et al. | |
| 2005/0046590 A1 | 3/2005 | Hall et al. | |
| 2005/0067159 A1 | 3/2005 | Hall et al. | |
| 2005/0070144 A1 | 3/2005 | Hall et al. | |
| 2005/0082092 A1 | 4/2005 | Hall et al. | |
| 2005/0092499 A1 | 5/2005 | Hall et al. | |
| 2005/0093296 A1 | 5/2005 | Hall et al. | |
| 2005/0095827 A1 | 5/2005 | Hall et al. | |
| 2005/0115717 A1 | 6/2005 | Hall et al. | |
| 2005/0145406 A1 | 7/2005 | Hall et al. | |
| 2005/0150653 A1 | 7/2005 | Hall et al. | |
| 2005/0161215 A1 | 7/2005 | Hall et al. | |
| 2005/0173128 A1 | 8/2005 | Hall et al. | |
| 2005/0212530 A1 | 9/2005 | Hall et al. | |
| 2005/0236160 A1 | 10/2005 | Hall et al. | |
| 2005/0279508 A1 | 12/2005 | Hall et al. | |
| 2005/0284659 A1 | 12/2005 | Hall et al. | |
| 2005/0284662 A1 | 12/2005 | Hall et al. | |
| 2005/0284663 A1 | 12/2005 | Hall et al. | |
| 2005/0285645 A1 | 12/2005 | Hall et al. | |
| 2005/0285705 A1 | 12/2005 | Hall et al. | |
| 2005/0285706 A1 | 12/2005 | Hall et al. | |
| 2005/0285751 A1 | 12/2005 | Hall et al. | |
| 2005/0285752 A1 | 12/2005 | Hall et al. | |
| 2005/0285754 A1 | 12/2005 | Hall et al. | |

* cited by examiner

APPARATUS FOR FIXING LATENCY

CROSS REFERENCE TO RELATED APPLICATIONS

The present application is a continuation-in-part of co-pending U.S. patent application Ser. No. 10/710,790 filed on Aug. 3, 2004, which is herein incorporated by reference. Said application, Ser. No. 10/710,790 claims priority of co-pending U.S. Provisional Patent Application Ser. No. 60/481,225 filed Aug. 13, 2003, which is herein incorporated by reference.

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

The present invention relates to the field of fixed latency operations in time sensitive applications, such as setting a clock or determining latency, particularly in a downhole network along a drill string used in oil and gas exploration, or along the casings and other equipment used in oil and gas production.

Many modern processors, computers and embedded systems are interrupt driven systems, where the execution of a program may vary by more than one million cycles due to interruptions by the processor and other programs. In time sensitive operations such as setting a clock or determining the total latency of a network, interruptions and variable delays may cause inaccurate results. Several systems and apparatuses having specialized hardware for fixed latency operations are known in the art.

U.S. Pat. No. 6,073,053 discloses a reflex I/O card for an industrial controller to provide outputs at a fixed delay in time or portion of a machine cycle after the inputs through dedicated hardware thus avoiding transmission delays and processing delays associated with the communication of information to a central processor.

U.S. Pat. No. 6,654,834 discloses a method and apparatus for data transfer employing closed loop of memory nodes. Data transfer between a master node and plural memory nodes follows a synchronous fixed latency loop bus. This configuration provides a fixed latency between the issue of a read command and the return of the read data no matter which memory node is accessed.

U.S. Pat. No. 6,580,720 discloses a latency verification system within a multi-interface point-to-point switching system (MIPPSS). According to one aspect of the invention, the switching fabric provides a fixed, low latency signal path for each connection whereby the latency of that connection is deterministic and predictable. Moreover, the switching system ensures that the data content of the signal delivered via that connection is not analyzed by the switching fabric, i.e., the switching fabric operates in a message-independent manner.

SUMMARY OF INVENTION

An apparatus for fixing latency within a deterministic region on a downhole network comprises a network interface modem, a high priority module and at least one deterministic peripheral device. The network interface modem is in communication with the downhole network. The high priority module comprises a packet assembler/disassembler and is in communication with the network interface modem. The at least one deterministic peripheral device is connected to the high priority module.

It should be noted that the term "latency" is intended to have a relatively broad meaning. "Computational latency" refers to the amount of time it takes for an instruction to be processed in a device from the time it is received (e.g. the time elapsed between receiving a request for information and transmitting said information). "Transmission latency" refers to the amount of time it takes for an electrical pulse to travel between two devices over a downhole network integrated into a downhole tool string. "Total signal latency" refers to a combination of computational latency and transmission latency. In this specification, the term "latency" refers to total signal latency.

It should be noted that the term "deterministic region" refers to a computational area where the time required for operations is without significant variation, and may be calculated. The term "non-deterministic region" refers to a computational area where the time required for operations has significant variation, and is indeterminate. The term "deterministic boundary" refers to a boundary between a deterministic region and a non-deterministic region.

In the preferred embodiment, the high priority module is designed exclusively in hardware. The hardware operates with a fixed computational latency and performs at least one operation on the at least one deterministic peripheral device. Typically, the high priority module is entirely within the deterministic region. The hardware may be at least one hardwired circuit, at least one integrated circuit, or at least one FPGA. Alternatively, the high priority module may comprise software of fixed computational latency.

The at least one deterministic peripheral device may be a clock, a local clock source, an analog circuit, or an actuator. Preferably, the clock is a hardware clock integrated circuit. The local clock source may be selected from the group consisting of at least one crystal, at least one transistor, at least one oscillator, at least one RC circuit, at least one LC circuit, and at least one RLC circuit. Typically, the high priority module is in communication with a local clock source, an actuator, a clock, a data buffer, and at least one router. The high priority module may be in communication with at least one node, at least one tool port, or at least one sensor.

The high priority module comprises a packet assembler/disassembler, and hardware for performing at least one operation. The packet assembler/disassembler has the functions of a packet assembler, and a packet disassembler. Alternatively, the high priority module may comprise a packet assembler and a packet disassembler as separate devices.

Disclosed is a high priority module that is separate from the network interface modem. Alternatively, the high priority module may be part of the network interface modem.

Disclosed is a method for performing an operation within a deterministic region which comprises providing a high priority module, recognizing a packet as the operation, and performing the operation. The high priority module is connected to a network interface modem in communication with a network. Typically, the network is integrated into a downhole tool string. The packet is recognized as the operation by the high priority module. Generally, the operation is performed in a deterministic region, and on a peripheral device. The high priority module may fill a field in the packet with data from the peripheral device. The high priority module may distinguish between high priority operations and lower priority operations.

Generally, the high priority module is connected to a buffer. Packets may be received from the network interface modem, or from the buffer. The method may also include the step of forwarding a packet, and the packet may be forwarded to the network interface modem or the buffer. The packet forwarded may be the packet or a packet modified by the operation. Typically, the packet may be recognized as a high priority operation, and may be performed immediately upon recognition.

Disclosed is an apparatus for performing at least one operation on a downhole device within a deterministic region. The apparatus comprises a control device, a downhole network, and a downhole device. The control device is near the surface of a downhole tool string. The control device comprises a network interface modem in communication with the downhole network, a high priority module in communication with the network interface modem, and at least one deterministic peripheral device connected to the high priority module. The downhole network is integrated into the downhole tool string. The downhole device comprises a network interface modem in communication with the downhole network, a high priority module in communication with the network interface modem, and at least one deterministic peripheral device connected to the high priority module.

Typically, the control device is a computer. The network interface modem and the high priority module of the control device may be on an insertable computer card. The control device may further comprise a connection to a local area network. In the preferred embodiment the control device comprises a local clock source and a clock. Preferably, the clock is a hardware integrated circuit. The clock may be synchronized to a GPS clock or another clock source over a LAN.

Typically, the downhole device further comprises a local clock source, an actuator, a clock, a data buffer, and at least one router. The downhole device may further comprise at least one node, at least one tool port, or at least one sensor.

DETAILED DESCRIPTION

Figure 1:
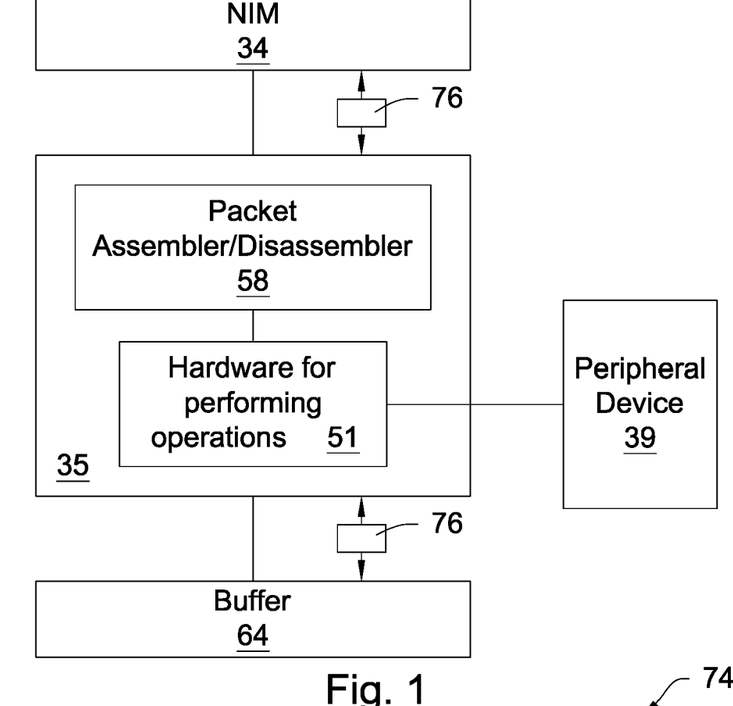
FIG. 1 is a block diagram of a high priority module.

FIG. 1 shows an embodiment of a high priority module 35. The high priority module 35 comprises a packet assembler/disassembler 58, and hardware for performing at least one operation 51. The packet assembler/disassembler 58 is in communication with a network interface modem (NIM) 34. The high priority module 35 is connected to a buffer 64. Packets 76 are passed between the high priority module 35 and the NIM 34 or the buffer 64. The hardware for performing operations 51 is in communication with the packet assembler/ disassembler 58, and a deterministic peripheral device 39. The hardware for performing operations 51 may be at least one hardwired circuit, at least one integrated circuit, or at least one FPGA.

Figure 2:
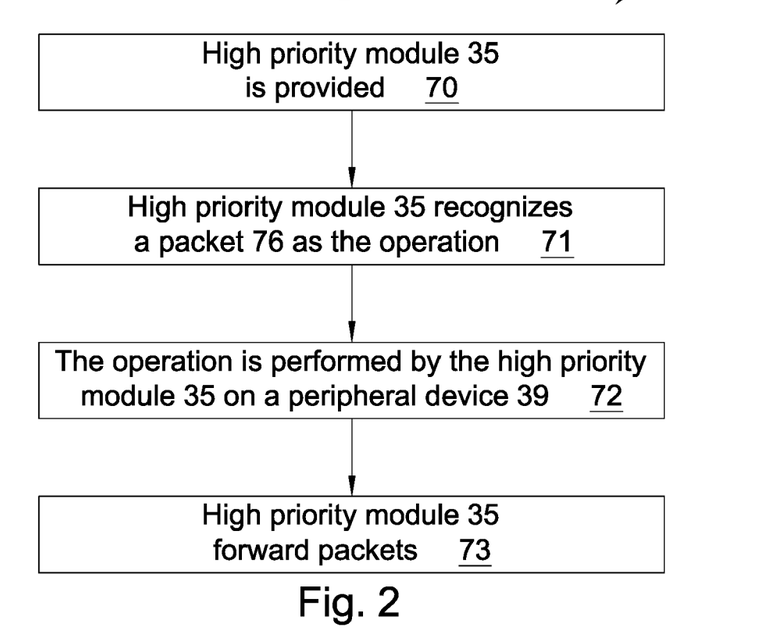
FIG. 2 is a flowchart of a method for performing an operation within a deterministic region.
Figure 3:
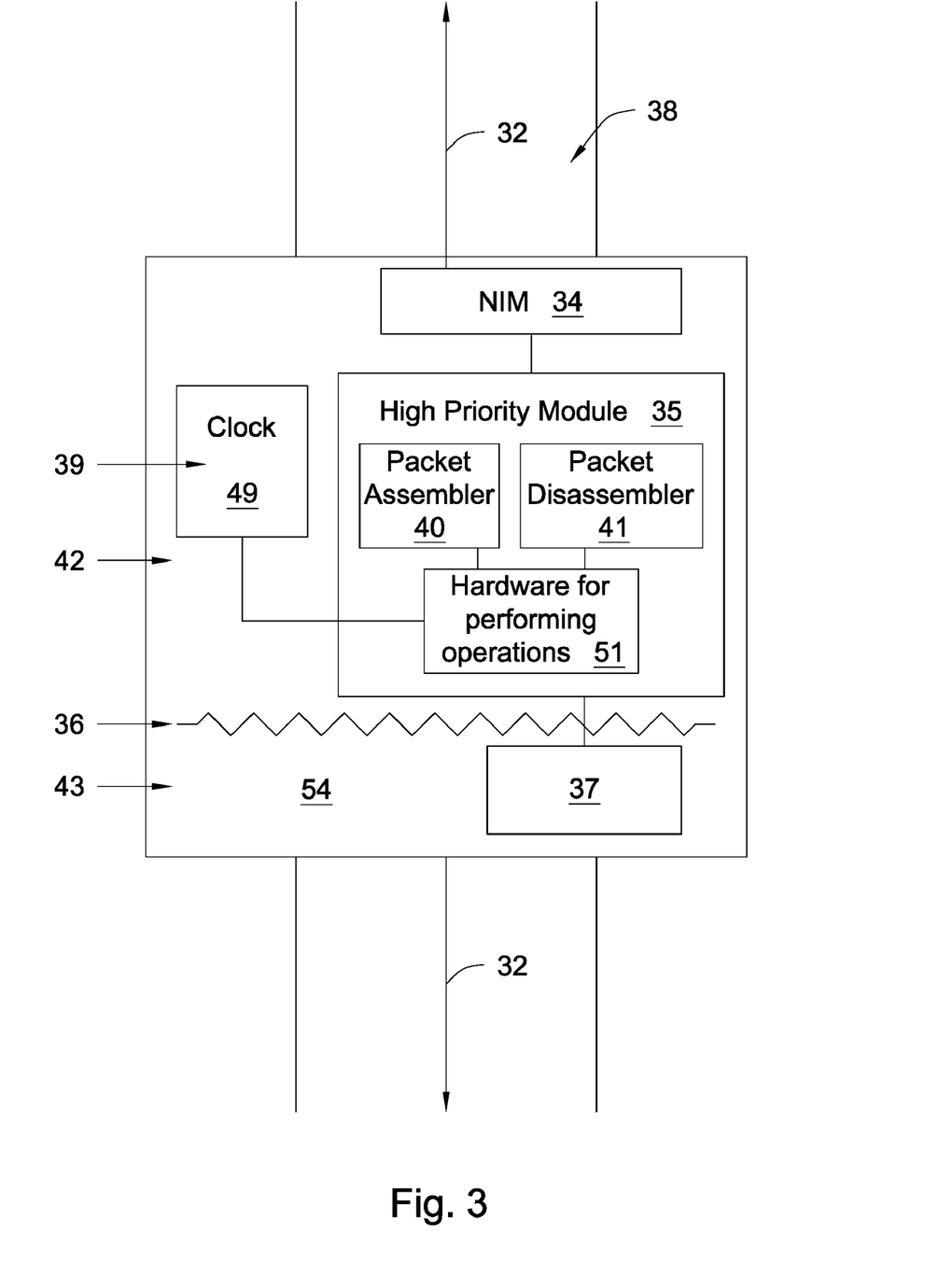
FIG. 3 is a block diagram of an apparatus for fixing computational latency.

FIG. 2 shows an embodiment of a method 74 for performing an operation within a deterministic region and refers to FIG. 1 and FIG. 3. Step 70 provides a high priority module 35 that is connected to a NIM 34 in communication with a network 32. The network 32 is typically integrated into a downhole tool string 38. The high priority module 35 may be connected to a buffer 64. In step 71 the high priority module 35 recognizes a packet 76 as the operation. The high priority module 35 may receive the packet 76 from the NIM 34, the buffer 64, or another device such as a router a local node, a tool port or a data acquisition device. Generally, the packet assembler/disassembler 58 recognizes the packet 76 as the operation. In step 72, the high priority module 35 performs the operation in a deterministic region 42 and on a peripheral device 39. Typically the packet assembler/disassembler 58 sends the operation to the hardware for performing operations 51, which then performs the operation on the peripheral device 39. The high priority module 35 may fill fields in the packet 76 with data from the peripheral device 39. In step 73, the high priority module 35 forwards the packet 76. Generally packets 76 that do not contain high priority operations are forwarded unchanged. The packet 76 may be forwarded to the NIM 34, the buffer 64, or another device such as a router, a local node, a tool port, or a data acquisition device. The packet 76 forwarded may be the original packet 76 or a packet 76 modified by the operation. An example of a packet 76 modified by an operation may be a packet 76 with a data field that was filled by the operation. Some packets 76 may be for another device such as a router, a local node, a tool port, or a data acquisition device. For those packets 76 that are for another device, the high priority module 35 may do nothing, or may forward the packet 76 without performing an operation. The operation may be a high priority operation which may be performed immediately upon recognition.

An example of a high priority operation may be setting a clock 49. The instruction to set the clock 49 encoded in a packet 76 is received by the NIM 34, and sent to the high priority module 35. The packet assembler/disassembler 58 recognizes the operation as high priority, and sends the instruction and the value for the clock 49 to the hardware for performing operations 51. The hardware 51 then sets the clock 49, which is a peripheral 39 to the high priority module 35. Because the packet 76 may be handled without interruption or variation, the time from the reception of the packet 76 to the setting of the clock 49 may be constant, and may be calculated, thereby setting the clock with a latency adjusted time.

Another example of a high priority operation may be reading the clock 49. The instruction to read the clock 49 is sent to the high priority module 35 either from the NIM 34 or from the buffer 64. The packet 76 to be sent may be assembled in the buffer 64 by the high priority module 35, and the field for the time value may be filled at the last possible moment before transmission of the packet 76. Alternatively, the packet 76 may be assembled in the buffer 64 or received directly from another device such as a router 45, a local node 46, a tool port 47, or a data acquisition device 48 and the high priority module 35 may simply pass the packet 76 to the NIM 34 and fill the field for the time value as the packet 76 is passed. Because the time from when the field for the time value is filled to when the packet 76 is transmitted may be without interruption or variation, that time may be constant, and may be calculated, and thus the clock value read may be adjusted by latency so an accurate time may be known.

FIG. 3 shows an embodiment of an apparatus for fixing computational latency 54. The NIM 34 is in communication with a downhole network 32 integrated into a downhole tool string 38. The high priority module 35 is in communication with the NIM 34 and with at least one deterministic peripheral device 39. The high priority module 35 comprises a packet disassembler 41, a packet assembler 40, and hardware 51 for performing at least one operation. The high priority module 35 may also be in communication with non-deterministic devices 37. The deterministic region 42 encompasses the NIM 34, the high priority module 35, and the deterministic peripheral device 39, such as a clock 49. Generally, the NIM 34, the deterministic peripheral device 39 and the high priority module 35 are in the deterministic region, which is separated from the non-deterministic region 43 by the deterministic boundary 36.

Figure 4:
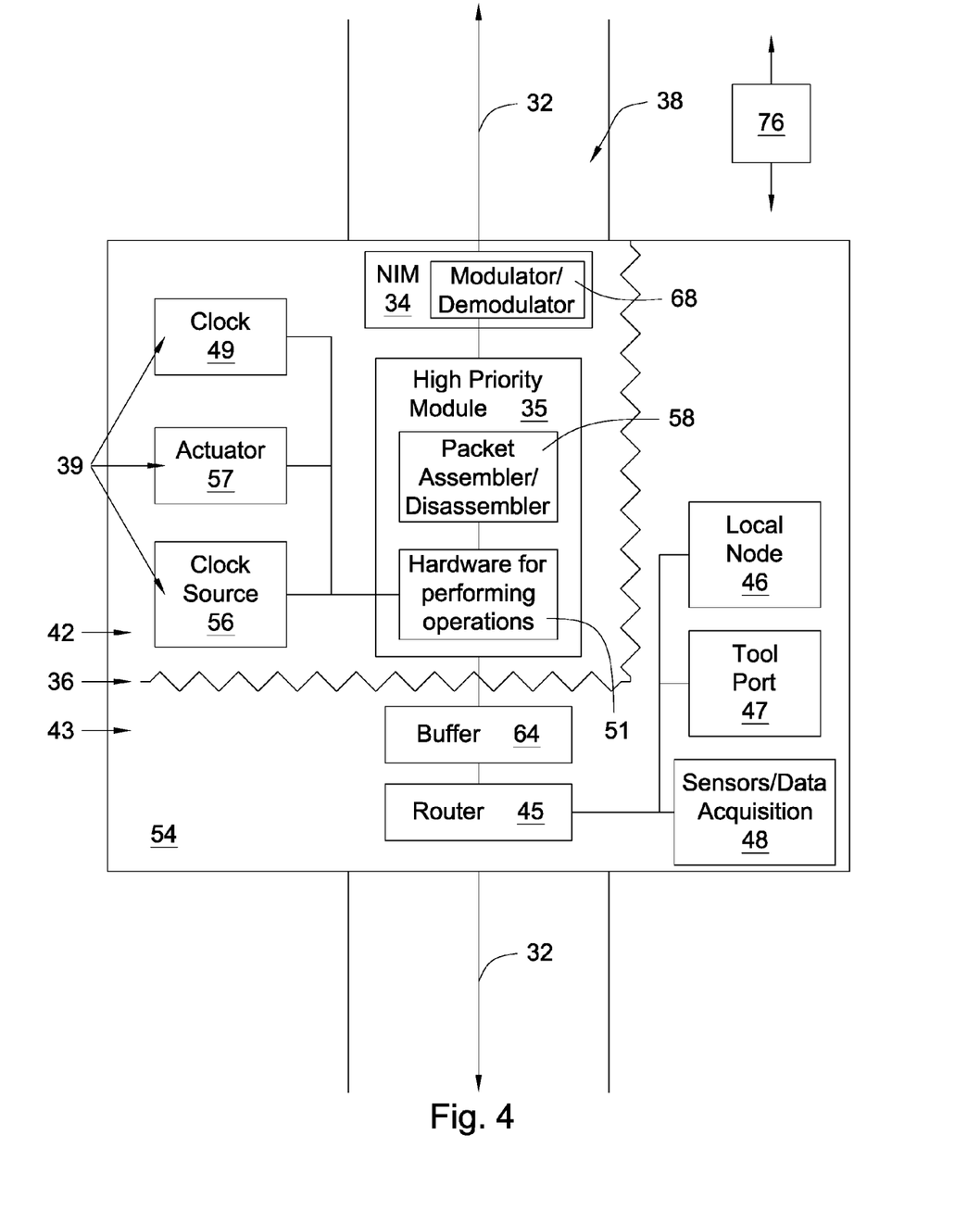
FIG. 4 is a detailed block diagram of an apparatus for fixing computational latency.

FIG. 4 shows a detailed embodiment of an apparatus 54 for fixing computational latency. The network interface modem 34 is in communication with a downhole network 32 integrated into a downhole tool string 38. The high priority module 35 is in communication with the network interface modem 34. The network interface modem 34 comprises a modulator/demodulator 68 for sending a bit stream over the network 32. The high priority module 35 is also in communication with deterministic peripheral devices 39. The deterministic peripheral devices 39 may be a clock 49, an actuator 57 or a clock source 56. The clock 49 may be a hardware integrated circuit. The high priority module 35 may comprise a packet assembler/disassembler 58 and hardware for performing operations 51. The high priority module 35 may also be in communication with a buffer 64, a router 45, local node circuitry 46, a tool port 47, and a data acquisition device 48. The packet assembler/disassembler 58 interprets the packet 76 as instructions to pass to either the hardware for performing operations 51 or to the buffer 64 which is in the non-deterministic region 43. The deterministic boundary 36 is the division between the deterministic region 42 and the non-deterministic region 43. The deterministic region encompasses the NIM 34, the high priority module 35, and at least one deterministic peripheral device 39.

In general, the high priority module 35 is responsible for passing information between the buffer 64 and the NIM 34. Loading the buffer 64 may be considered non-deterministic, and therefore may fall within the non-deterministic region 43. Loading the buffer 64 may not be handled by the high priority module 35. Actions such as reading and setting the clock 49, actuating the actuator 57 or receiving oscillations from the clock source 56 may be considered to be deterministic, and may be handled by the high priority module 35 exclusively in the deterministic region 42 such that the time required to perform the operations may be constant and may be calculated. Other operations may be performed by local node circuitry, a tool (not shown) connected to the tool port 47 or a data acquisition device 48 in a non-deterministic region 43.

Figure 5:
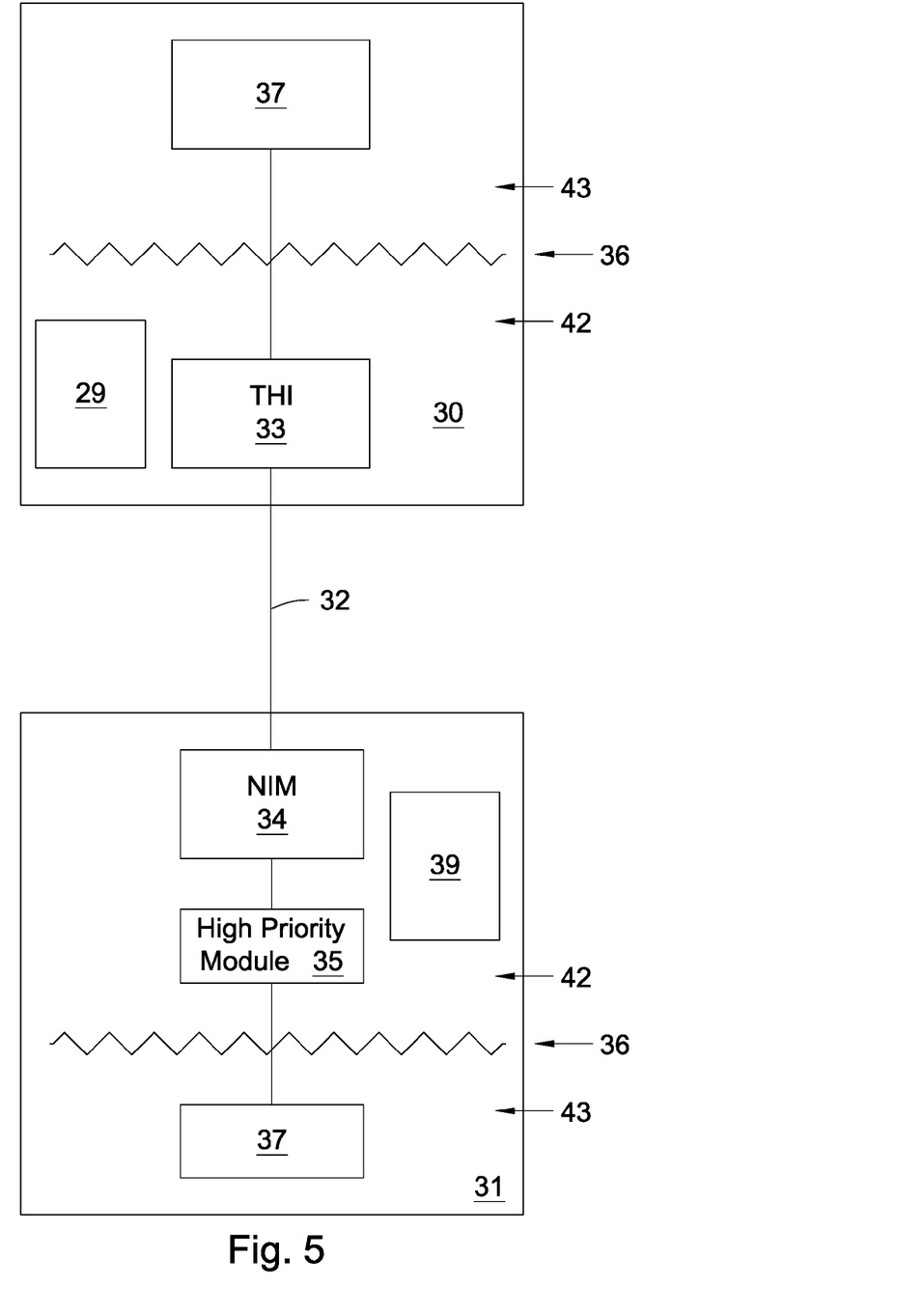
FIG. 5 is a block diagram of a control device in communication with a downhole device over a downhole network.
Figure 7:
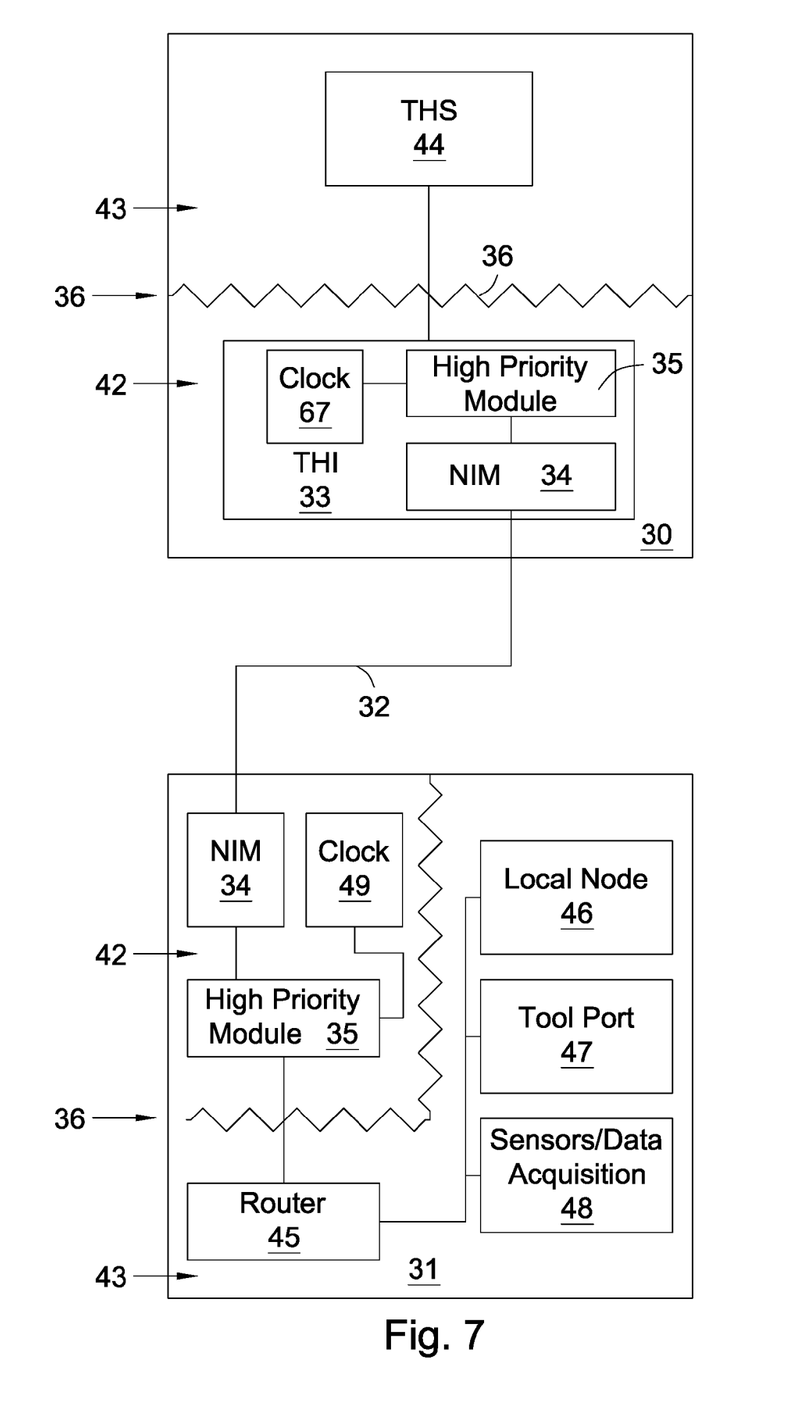
FIG. 7 is a block diagram of a control device in communication with a downhole device over a downhole network.

FIG. 5 shows an embodiment of a control device 30 in communication with a downhole device 31 over a downhole network 32. The control device 30 comprises a tophole interface (THI) 33. The THI 33 is inside the deterministic region 42, is in communication with the downhole network 32, and may be in communication with deterministic devices 29 of the control device 30 in the deterministic region 42, or non-deterministic devices 37 in the non-deterministic region 43. The deterministic devices 29 may be a clock 49, a clock source (not shown), a timer (not shown), a digital device (not shown), or an analog device (not shown) with a fixed computational latency. The non-deterministic devices 37 may be a buffer 64 (seen in FIG. 4), a router 45, local node circuitry 46, a data acquisition device 48, a downhole tool (not shown), a server (not shown), or an embedded system (not shown). The downhole device 31 comprises a NIM 34 a high priority module 35, a deterministic peripheral device 39, and other non-deterministic devices 37. The NIM 34 is in communication with the downhole network 32 and the high priority module 35. The high priority module 35 is connected to a deterministic peripheral device 39, and may be in communication with other non-deterministic devices 37. A more detailed embodiment of a control device 30 in communication with a downhole device 31 over a downhole network 32 is shown in FIG. 7. Operations may be performed in a deterministic region 42 by deterministic devices 29, 33, 34, 35, 39 or in a non-deterministic region 43 by non-deterministic devices 37.

The following example illustrates an operation performed in a deterministic region 42 by a control device 30 in communication with a downhole device 31 over a downhole network 32, and for this example the deterministic device 29 and the peripheral deterministic device 39 are assumed to be clocks 49. An operation such as setting a clock 39 may be initiated in a non-deterministic device 37, such as a server (not shown), in the control device 30. The non-deterministic device 37 may pass a packet 76 as shown previously containing null or dummy values for the time to be set to the THI 33. The THI may then read the time value from the clock 29 immediately before sending the packet 76. The NIM 34 may receive the packet and pass it to the high priority module 35, which then sets the clock 49. Preferably, all operations done between reading the time value from the clock 29 in the control device 30 to setting the clock 39 of the downhole device 31 are done within the deterministic region 42 such that the time required may be constant and may be calculated. This may allow the time required to be compensated for, such that the clock 39 may be set to the same time as the clock 29.

Figure 6:
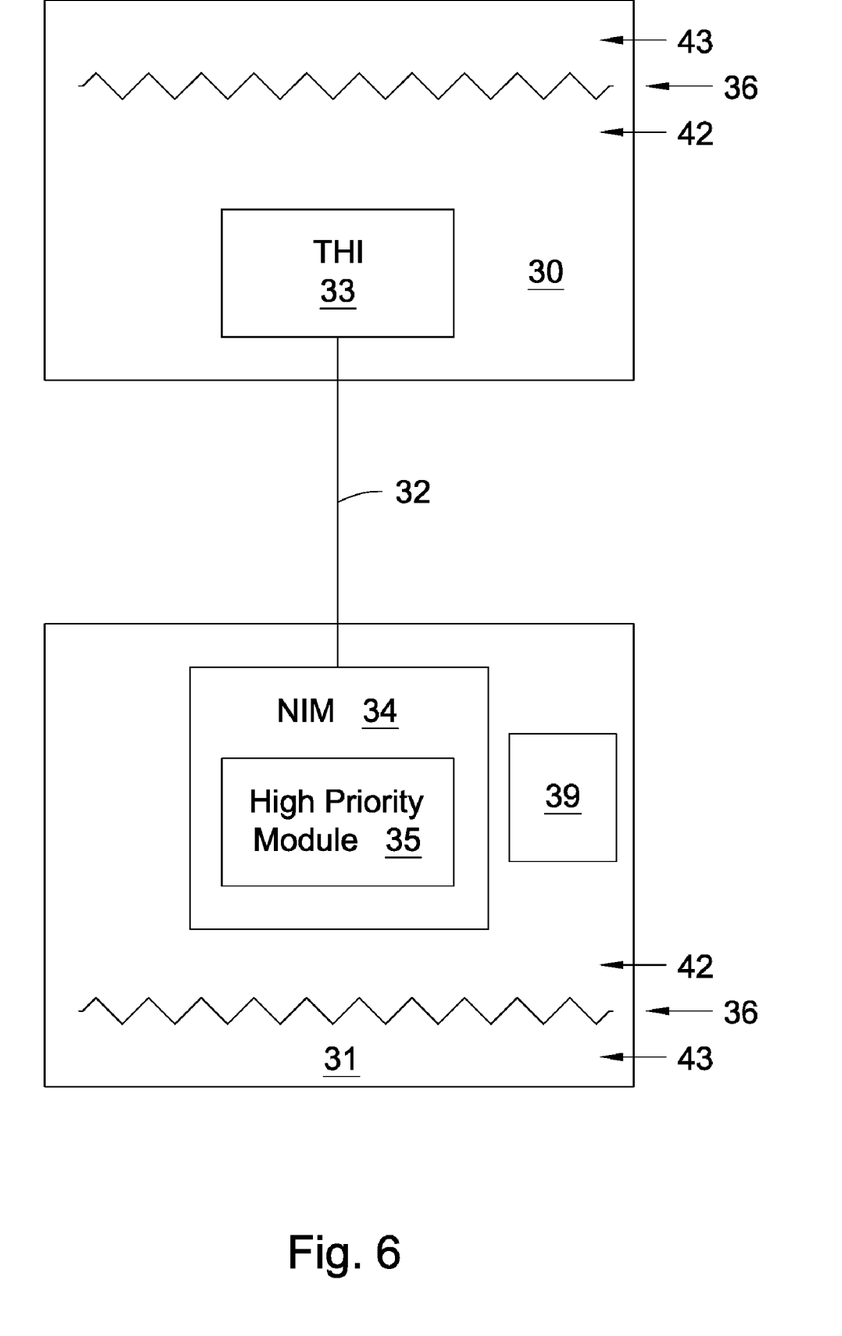
FIG. 6 is a block diagram of a control device in communication with a downhole device over a downhole network.

FIG. 6 shows an embodiment of a control device 30 in communication with a downhole device 31 over a downhole network 32. The control device 30 comprises a THI 33. The THI 33 is inside the deterministic region 42, and is in communication with the downhole network 32. The downhole device 31 comprises a deterministic peripheral device 39 and a NIM 34. In this embodiment the NIM 34 further comprises a high priority module 35. The deterministic region 42 encompasses the THI 33, the downhole network 32 the NIM 34 and the deterministic peripheral device 39. The deterministic boundary 36 separates the deterministic region 42 from the non-deterministic region 43. In this embodiment, there are no non-deterministic devices 37 as seen previously, and all operations are handled in the deterministic region 42.

FIG. 7 shows our preferred embodiment of a control device 30 in communication with a downhole device 31 over a downhole network 32. The control device 30 comprises a top-hole server (THS) 44 and a THI 33. The THS 44 is implemented in software and is therefore in the non-deterministic region 43. The THI 33 is in the deterministic region 42 and comprises a NIM 34, a clock 67, and a high priority module 35. The downhole device 31 comprises a NIM 34, a high priority module 35, a clock 49, a router 45, local node circuitry 46, a tool port 47, and data acquisition devices 48. The NIM 34, the high priority module 35 and the clock 49, are all inside the deterministic region 42. The router 45, the local node 46, the tool port 47 and data acquisition devices 48 are in the non-deterministic region 43. In general, the NIM 34 is in communication with the downhole network 32 and the high priority module 35. The clock 49 is a deterministic peripheral device 39 connected to the high priority module 35 of the downhole device 31. The deterministic boundary 36 separates the non-deterministic region 43 and the deterministic region 42. The deterministic region 42 also encompasses transmitting media of the downhole network 32.

Figure 8:
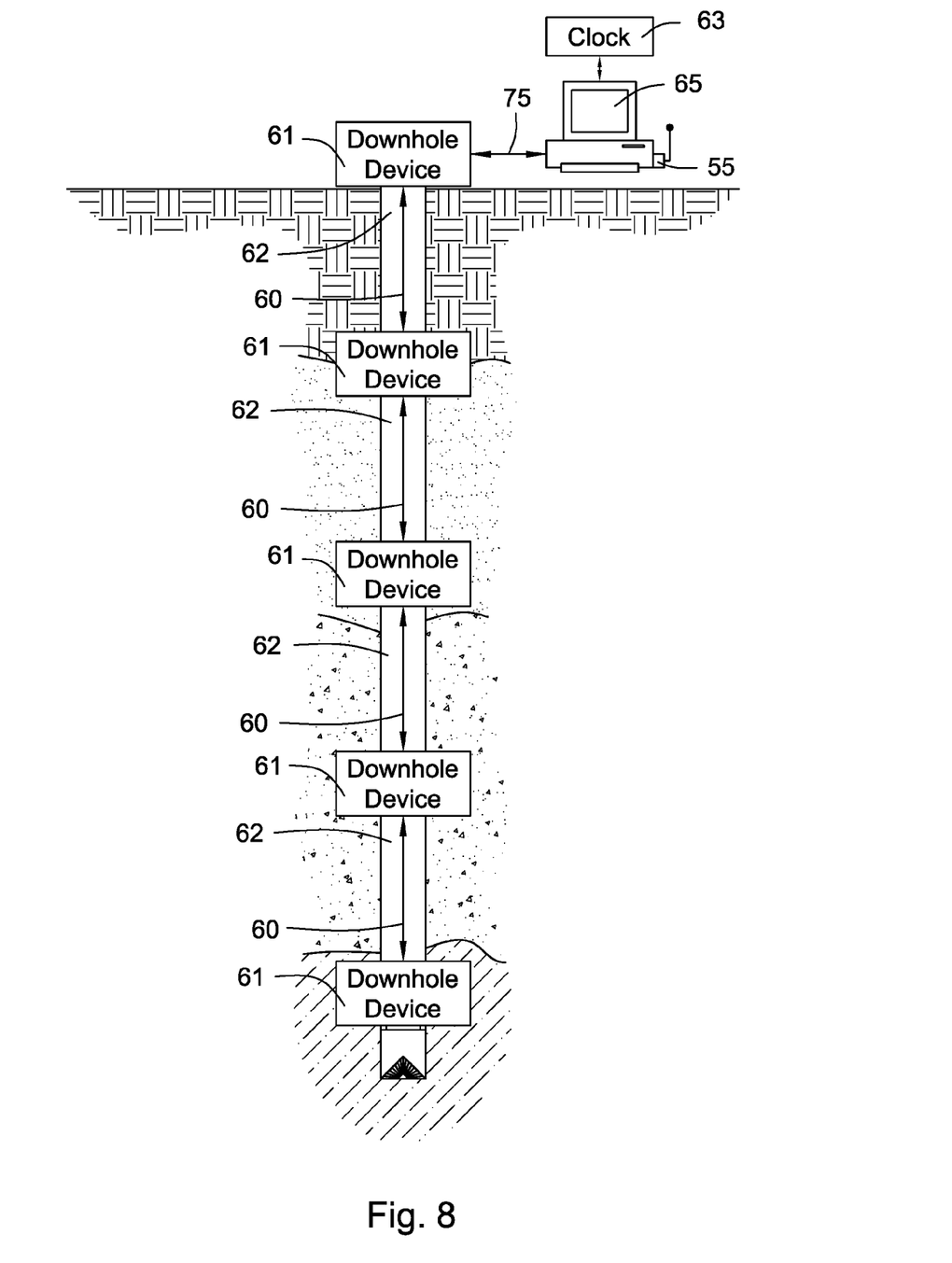
FIG. 8 is a block diagram of an integrated downhole network in a downhole tool string.

FIG. 8 shows an embodiment of an integrated downhole network 60 in a downhole tool string 62 with multiple downhole devices 61. The control device 65 is connected 75 to a downhole network 60 integrated into a downhole tool string 62. The control device 65 may be a computer, and may comprise a clock 63. The clock 63 may be synchronized to a GPS clock or another clock source over a LAN. The NIM 34 and the high priority module 35 may be on an insertable computer card (not shown). The control device 65 comprises a connection to a local area network 55. A system that may be used as a downhole network is disclosed in U.S. Pat. No. 6,670,880 to Hall, et al., incorporated herein by this reference, which discloses a system for transmitting data through a string of downhole components.

Whereas the present invention has been described in particular relation to the drawings attached hereto, it should be understood that other and further modifications apart from those shown or suggested herein, may be made within the scope and spirit of the present invention.

The invention claimed is:

1. An apparatus for fixing latency of an operation within a deterministic region of a network in a downhole drill string;
said drill string comprising a plurality of tubulars configured to form a network when coupled to one another to penetrate a subsurface formation;
said tubulars configured with magnetically conductive, electrically insulating elements at both ends thereof for signal passage along each tubular and between coupled tubulars;
said apparatus comprising:
a network interface modem in communication with the network;
a high priority module in communication with the network interface modem, the high priority module configured to recognize packets that contain high priority operations;
the high priority module comprising a packet assembler/disassembler, and hardware for performing the high priority operations; and
at least one deterministic peripheral device connected to the high priority module;
wherein the hardware performs the high priority operations on the deterministic peripheral device according to instructions received and interpreted by the packet assembler/disassembler.

2. The apparatus of claim 1, wherein the hardware of the high priority module is selected from the group consisting of at least one hardwired circuit, at least one integrated circuit, and at least one FPGA.

3. The apparatus of claim 1, wherein the packet assembler/disassembler comprises a packet assembler and a packet disassembler wherein the packet assembler and the packet disassembler are two separate circuits.

4. The apparatus of claim 1, wherein the at least one deterministic peripheral device is selected from the group consisting of a clock, a local clock source, at least one timer, at least one analog circuit, at least one digital circuit, and at least one actuator.

5. The apparatus of claim 4, wherein the clock is a hardware integrated circuit.

6. The apparatus of claim 4, wherein the local clock source is selected from the group consisting of at least one crystal, at least one transistor, at least one oscillator, at least one RC circuit, at least one LC circuit, and at least one RLC circuit.

7. The apparatus of claim 4, wherein the clock is synchronized to one of a GPS clock and a clock source over a LAN.

8. The apparatus of claim 1, wherein the high priority module is in communication with devices selected from the group consisting of a data buffer, at least one router, at least one node, at least one tool port, and at least one data acquisition device.

9. The apparatus of claim 1, wherein the high priority module is part of the network interface modem.

10. The apparatus of claim 1, wherein the deterministic region encompasses devices selected from the group consisting of the high priority module, the network interface modem, and the at least one deterministic peripheral device.

11. A method for performing an operation within a deterministic region of a network in a downhole drill string, comprising:
disposing a column of tubulars downhole to penetrate a subsurface formation, the tubulars configured to form a network when coupled to one another;
said tubulars configured with magnetically conductive, electrically insulating elements at both ends thereof for signal passage along each tubular and between coupled tubulars;
providing a high priority module connected to a network interface modem in communication with the network, the high priority module configured to recognize packets that contain high priority operations;
recognizing, by the high priority module, a packet containing a high priority operation; and
performing, by the high priority module, the high priority operation on a peripheral device located within a deterministic region of the network.

12. The method of claim 11, wherein the high priority module fills a field in a packet with data from the peripheral device.

13. The method of claim 11, wherein the high priority module is connected to a buffer.

14. The method of claim 13, wherein the packet is received from a device selected from the group consisting of a network interface modem, a buffer, a router, a local node, a tool port, and a data acquisition device.

15. The method of claim 13, wherein the method further comprises the step of forwarding a packet by the high priority module.

16. The method of claim 15, wherein the packet is forwarded to a device selected from the group consisting of a network interface modem, a buffer, a router, a local node, a tool port, and a data acquisition device.

17. The method of claim 15, wherein the packet forwarded is selected from the group consisting of an unmodified packet and a packet modified by the high priority operation.

18. The method of claim 11, wherein the high priority operation is performed immediately upon recognition.

19. An apparatus for fixing latency of an operation within a deterministic region of a downhole network integrated into a drill string;
said drill string comprising a column of tubulars disposed downhole to penetrate a subsurface formation, the tubulars configured to form a downhole network when coupled to one another,
said tubulars configured with magnetically conductive, electrically insulating elements at both ends thereof for signal passage along each tubular and between coupled tubulars;
said apparatus comprising:

a control device near the surface of the downhole drill string, the control device comprising a network interface modem in communication with the downhole network, a high priority module in communication with the network interface modem and configured to recognize packets that contain high priority operations, and at least one deterministic peripheral device connected to the high priority module.

20. The apparatus of claim 19, wherein the control device is a computer.

21. The apparatus of claim 20, wherein the network interface modem and the high priority module are embodied in an insertable computer card.

22. The apparatus of claim 19, wherein the control device further comprises a connection to a local area network.

23. The apparatus of claim 19, wherein the at least one deterministic peripheral device is selected from the group consisting of a local clock source, at least one analog circuit, at least one actuator, a clock, and a hardware clock integrated circuit.

24. The apparatus of claim 23, wherein the local clock source is selected from the group consisting of at least one crystal, at least one transistor, at least one oscillator, at least one RC circuit, at least one LC circuit, and at least one RLC circuit.

25. The apparatus of claim 23, wherein the clock is synchronized to a GPS clock.

26. The apparatus of claim 19, wherein the high priority module is part of the network interface modem.

27. The apparatus of claim 19, wherein the deterministic region encompasses devices on the network selected from the group consisting of transmission media, the high priority module, the network interface modem, and the at least one deterministic peripheral device.

28. The apparatus of claim 19, further comprising a downhole device in communication with the downhole network, said device comprising non-deterministic devices selected from the group consisting of a data buffer, at least one router, at least one node, local node circuitry, at least one tool port, and at least one data acquisition device.

* * * * *